(12) United States Patent
Kirsamer et al.

(10) Patent No.: US 10,289,089 B2
(45) Date of Patent: May 14, 2019

(54) FIELD DEVICE

(71) Applicant: FESTO AG & Co. KG, Esslingen (DE)

(72) Inventors: Uwe Kirsamer, Weilheim (DE); Danny Schneider, Esslingen (DE); Thomas Lederer, Kernen (DE)

(73) Assignee: FESTO AG & Co. KG, Esslingen (DE)

( * ) Notice: Subject to any disclaimer, the term of this patent is extended or adjusted under 35 U.S.C. 154(b) by 396 days.

(21) Appl. No.: 15/106,054

(22) PCT Filed: Dec. 20, 2013

(86) PCT No.: PCT/EP2013/003885
§ 371 (c)(1),
(2) Date: Jun. 17, 2016

(87) PCT Pub. No.: WO2015/090345
PCT Pub. Date: Jun. 25, 2015

(65) Prior Publication Data
US 2016/0320761 A1    Nov. 3, 2016

(51) Int. Cl.
*G05B 19/43* (2006.01)
*G05B 19/042* (2006.01)
(Continued)

(52) U.S. Cl.
CPC ......... *G05B 19/0423* (2013.01); *G05B 19/43* (2013.01); *G05B 2219/25004* (2013.01);
(Continued)

(58) Field of Classification Search
CPC .......... G05B 19/00; G05B 2219/25428; G05B 2219/31121; G05B 19/43
(Continued)

(56) References Cited

U.S. PATENT DOCUMENTS 6,297,612 B1    10/2001   Shloush et al.
7,168,042 B2 *   1/2007   Braun ................... G05B 19/00
                                                          345/156
(Continued)

FOREIGN PATENT DOCUMENTS

DE         29807097       10/1998
EP          1607810       12/2005

*Primary Examiner* — Michael J Brown
(74) *Attorney, Agent, or Firm* — Hoffmann & Baron, LLP

(57) ABSTRACT

A field device for controlling actuators and for processing and relaying sensor signals, having a control unit for providing control signals, having a transmission device for transmitting the control signals within the field device, wherein the transmission device comprises at least one interface designed for electrical coupling of a function module, having at least one function module designed as an engine control module, which is equipped for controlling at least one electrical drive depending on control signals from the control unit, wherein the control unit and the function module are electrically connected to each other by means of the transmission device, wherein the transmission device is designed for providing electrical drive energy to the engine control module and wherein the engine control module is designed for providing electrical drive energy to the drive in order to enable operation of the electrical drive with the electrical drive energy.

20 Claims, 2 Drawing Sheets

(51) Int. Cl.
*G03B 19/00* (2006.01)
*G05B 19/33* (2006.01)

(52) U.S. Cl.
CPC .............. *G05B 2219/25028* (2013.01); *G05B 2219/25322* (2013.01)

(58) Field of Classification Search
USPC .......................................... 700/19, 258, 275
See application file for complete search history.

(56) References Cited

U.S. PATENT DOCUMENTS

2013/0329377 A1    12/2013   Berner et al.
2013/0344818 A1*   12/2013   McGuire ................ G01D 21/00
                                                                                     455/73

* cited by examiner

FIELD DEVICE

This application claims priority based on an International Application filed under the Patent Cooperation Treaty, PCT/EP2013/003885, filed Dec. 20, 2013.

BACKGROUND OF THE INVENTION

The invention relates to a field device for controlling actuators and for processing and relaying sensor signals, having a control unit for providing control signals, having a transmission device for transmitting the control signals within the field device, wherein the transmission device comprises at least one interface, which is designed for electrical coupling of a function module, having at least one function module designed as an engine control module, which is equipped for controlling at least one electrical drive depending on control signals from the control unit, wherein the control unit and the at least one function module are electrically connected to each other by means of the transmission device.

From the product catalogue "simatic ET 200" from the company Siemens dated April 2005, a field device is known for use in an automation system. This field device is provided for connection to a field bus and has a modular structure such that differently configured interface modules, which are designed for connection with different field bus systems, can be connected to so-called periphery modules. The task of the periphery module is, for example to record and process sensor signals or to control electrical drives. The periphery modules provided for controlling electrical drives are also designated as engine starters and are designed, on the one hand, for a signal-transmitting connection with the interface module and, on the other hand, for a power-transmitting connection with a so-called terminal module, wherein the terminal module is provided for feeding in the electrical energy for the electrical drives to be controlled via a so-called energy bus. Accordingly, two bus systems independent of each other are provided in the known field device, on the one hand, the energy bus for supplying the engine starter and, on the other hand, a signal bus for transmitting electrical signals within the field device.

SUMMARY OF THE INVENTION

The object of the invention consists of providing a field device with a simplified structure.

This object is achieved for a field device of the type mentioned in the introduction having the following features: the field having a control unit for providing control signals; having a transmission device for transmitting the control signals within the field device; wherein the transmission device comprises at least one interface, which is designed for electrical coupling of a function module, having at least one function module designed as an engine control module, which is equipped for controlling at least one electrical drive depending on control signals from the control unit, wherein the control unit and the at least one function module are electrically connected to each other by means of the transmission device, wherein the transmission device is formed from a plurality of transmission modules electrically coupled to each other, wherein each of the transmission modules comprises an interface for electrical or for electrical and mechanical coupling of a function module as well as electrical lines with contact elements for electrical coupling with adjacent transmission modules; wherein the electrical lines are designed for providing the drive energy and the control signals to the interface and to adjacent transmission modules and wherein the transmission device is designed for providing at least one fluid flow to at least one interface and wherein at least one transmission module is provided with a fluid channel which leads to the assigned interface and wherein at least one function module is a valve module. In this connection, provision is made for the transmission device to be designed for providing electrical drive energy to the engine control module and for the engine control module to be designed for providing the electrical drive energy to the at least one drive in order to enable operation of the electrical drive with the electrical drive energy.

The transmission device according to the invention thus serves, on the one hand, for transmitting control signals within the field device and, on the other hand, also for transmitting electrical drive energy such that, departing from the aforementioned prior art, no separation into a signal bus system and an energy bus system is required. In fact, a particularly compact arrangement of electrical lines is enabled by the transmission device according to the invention, wherein function modules, which are coupled to the transmission device via interfaces and are not designed as engine control modules, can similarly access the drive energy in order to use it as an electrical supply for their respective internal purposes. Function modules of this type, which are not designed as engine control modules, can, for example be designed as input/output modules, which are provided for example for coupling sensors in order to be able to make the sensor signals of these sensors available to the control unit via the transmission device. Differently designed function modules, which are similarly not engine control modules, can be designed, for example as fluid valves which are controlled as a function of control signals from the control unit and can close or release fluid flows. Function modules of this type comprise, for example solenoid valves or piezo valves which are, however, not to be considered electrical drives, which should be controlled by the engine control modules. In fact, the engine control modules are designed for controlling step engines, brushed DC engines, brushless DC engines or linear direct drives, which are designed for introducing movements to machine elements, such as toothed wheels, lever gears, eccentrics or for direct movement of tools. Provision is preferably made for the transmission device and the engine control module to be designed in order to transmit and to influence electrical voltages greater or equal to 12 volts, preferably greater or equal to 24 volts, in particular greater or equal to 48 volts. The electrical drives connectable to the engine control modules have, for example electrical power of at least 10 watts, preferably at least 20 watts, in particular at least 50 watts.

This structure of the field device has the advantage that the engine control modules can be easily interchanged and is similarly presented to a user like other function modules, which are designed, for example as fluid valves for controlling pneumatic consumers.

Advantageous refinements of the invention are the subject matter of the dependent claims.

It is expedient for the transmission device to be designed for providing electrical drive energy to a plurality of engine control modules. A plurality of electrical drives can thus be operated independently of each other by a plurality of engine control modules without additional actions, wherein all engine control modules as well as optionally different function modules are supplied with electrical drive energy by means of the transmission device. To this end, the transmission device comprises suitably configured electrical lines with sufficiently large wire cross-section for providing the electrical drive energy such that it is ensured that the transmission device is not overloaded when a plurality of electrical drives are operated in parallel.

In a further configuration of the invention, provision is made for at least one function module, in particular an engine control module to be designed for coupling electrical energy to the transmission device. Using such a function module, the electrical drive energy required for operating the electrical drives can thus either be carried out in addition to another coupling or coupled exclusively only by the respective function module to the transmission device. In the case of additional coupling of electrical drive energy to the transmission device, it must be assumed that the field device is already innately provided with an electrical supply unit which can make sufficient electrical drive energy available at least for a certain number of electrical drives via the transmission device. In this case, for example when a predefined power level for the electrical drive energy is exceeded, an additional coupling of electrical energy to the transmission device is provided with the aid of at least one further function module. Alternatively, provision is made for the electrical drive energy to be coupled to the transmission device exclusively via one or a plurality of correspondingly designed function modules. This design of the electrical supply for the transmission device should be preferred when an electrical supply of a bus node optionally assigned to the control unit, the control unit and the function modules, not designed as engine control modules, is enabled via a field bus connected at the bus node. In this respect, the bus node serves for a bidirectional conversion of bus commands and of status information between a predefinable field bus protocol and the internal signal transmission protocol as well as optionally coupling electrical energy, which is intended to supply the control unit and the other function modules, but not the engine control modules. Accordingly, precisely the drive energy, which is required by the engine control modules for operating the electrical drives, is made available via the function modules designed for coupling electrical energy. Depending on the number and power requirement of the electrical drives assigned to the engine control modules, a plurality of function modules designed for coupling electrical energy to the transmission device can be provided. Additionally or alternatively, at least one function module designed as an engine control module can be equipped to relay electrical energy fed back by an electrical drive in a braking case to the transmission device and pass it on to other electrical drives which are connected to the same or to different engine control modules. A particularly efficient electrical mode of operation for the electrical drives connected to the field device is hereby enabled.

It is advantageous for the transmission device to be formed from a plurality of transmission modules electrically coupled to each other, wherein each of the transmission modules comprises an interface for electrical or for electrical and mechanical coupling of a function module as well as electrical lines with contact elements for electrical coupling with adjacent transmission modules, wherein the electrical lines are designed for providing the drive energy and the control signals to the interface and to adjacent transmission modules. By subdividing the transmission device into a plurality of transmission modules, a virtually completely freely scalable structure of the field device is possible. Accordingly, the field device can be precisely adapted to the requirements which are set by the electrical drives to be controlled and the sensors to be read and optionally the fluidic consumers similarly controllable by the field device.

Each of the transmission modules comprises, on the one hand, an interface for coupling at least one function module, furthermore the electrical lines accommodated in the respective transmission module, which are designed for the transmission of control signals and relaying of electrical drive energy, are provided on the end face in each case with electrically conductive contact elements, in particular sockets and plug connections. Electrical coupling to adjacent transmission modules can hereby be easily ensured.

In the case of an advantageous refinement of the invention, provision is made for the transmission device to be designed for providing at least one fluid flow to at least one interface and at least one transmission module is provided with a fluid channel, which leads to the assigned interface. At least one of the function modules to be installed on the field device can be designed as a fluid control module, which is designed for influencing a fluid flow to a fluidic consumer such as for example a fluid operable actuator. In order to easily ensure provision of the required fluid flow, a fluid channel is designed in the respectively assigned transmission module, which can be brought into communicating fluidic connection with a fluid source. The fluid flow can flow through this fluid channel to the interface in order to enter the assigned function module from there and to be provided there in a suitable manner, in particular by use of corresponding valve means to a fluid connection of the respective function module for the fluid consumer. A plurality or all transmission modules are preferably provided with at least one fluid channel such that at least one fluid channel extends through the field device parallel to the transmission device for the electrical signals and the electrical drive energy, whereby a particularly simple fluid supply of a plurality of function modules can be ensured.

In a further configuration of the invention, provision is made for the transmission modules, the assigned interfaces and the function modules arranged on the interfaces to be equipped with sealing means corresponding to each other, which ensure protection from dust and complete protection against contact and protection against strong jet water, in particular according to IP-65, for the electrical lines and contact elements of the transmission modules and for the components accommodated in the function modules. In the case of suitable equipping of the transmission modules and the function modules, an arrangement of the field device directly on a device to be controlled by the field device, in particular a tool machine or an industrial robot, is enabled, without having to house the field device in a protective switch cabinet for this purpose. Short connection paths between the function modules and the electrical and/or fluidic drives to be controlled thereby and the sensors to be read can hereby be enabled, whereby electrical and optionally fluidic losses between the field device and the actuators to be controlled can be minimised and/or wear-sensitive sensor lines can be reduced along their length. It is particularly advantageous for the components of the field device, i.e. also the optionally provided bus node and the control unit, to be protected according to the requirement of IP-65 or even IP-67, as laid down in the standards DIN 40 050 or DIN EN 60 529.

It is expedient for the transmission modules to be arranged along an alignment axis and the interfaces to be arranged at an installation plane aligned parallel to the alignment axis. In this respect, adjacently arranged transmission modules are in electrical connection via the respectively assigned contact elements such that it is ensured that the electrical lines of the transmission modules extend continuously along the alignment axis through the transmission device. The interfaces of the transmission modules are arranged preferably in a common installation plane or at least in installation planes parallel to each other. All function modules can hereby, for example be similarly coupled to the transmission modules by inserting or removing in a direction transversal to the alignment axis or be decoupled from the transmission modules.

At least one engine control module preferably comprises a communication device for communication with further engine control modules and is equipped for forming a power network of engine control modules for the common supply of an electrical drive with drive energy. Using the communication device, common operation of a plurality of engine control modules is strived for in order to be able to operate, for example an electrical drive with a power requirement which is above the capacity of the individual engine control modules. With the aid of the communication device, a plurality of engine control modules can accordingly be operated such that the overall electrical power that can be provided by them corresponds to the power required by the corresponding electrical drive. In this respect, the communication device can be designed for direct communication between the engine control modules, for example by wireless signal transmission. Alternatively, provision can be made for the communication device to be provided for wired communication of the engine control modules apart from the transmission device, as is enabled, for example by direct cabling of adjacent engine control modules. In the case of a further alternative, provision can be made for the communication device to be provided for communication via the transmission device, in particular with the control unit in order to achieve the desired synchronisation of a plurality of engine control modules forming the power network using the control unit.

In the case of an advantageous refinement of the invention, provision is made for at least one engine control module to comprise a communication device for communication with further engine control modules and to be designed for coordinated distribution of regenerated drive energy of the respectively assigned electrical drive to the further engine control modules. Efficient energy use of regenerated drive energy of different electrical drives can be hereby carried out in particular for the electrical drives which do not have to be necessarily operated within a predefined time window. Provision can, for example be made to supply one or a plurality of electrical drives, which have to be operated only occasionally and not at precisely specified time points, with electrical drive energy when a further electrical drive is transferred from a movement state into a standby state and in this respect the kinetic energy stored in this drive and the movement device driven thereby can be fed back in the form of electrical power to the respectively assigned engine control module: depending on the application case, the electrical drive energy to be fed into the field device externally can hereby be significantly reduced. It is particularly advantageous for feedback of electrical energy to be able to be coordinated by the engine control module or by the engine control modules such that a nominal overall power consumption of the electrical drives connected to the field device can exceed a nominal electrical capacity of the transmission device since through the feedback of electrical drive energy, efficient utilisation of the transmission device is enabled.

It is advantageous for at least one engine control module to comprise a configuration interface which is designed for connection of a programming device usable for configuring the engine control module. This direct configuration of the respective engine control module with the aid of a programming device can optionally be provided additionally or alternatively to a configuration of the engine control module via a configuration interface assigned to the control unit or by means of a superordinate control system which communicates with the bus node via the field bus. It is particularly advantageous for the engine control modules to be connected to each other such that a plurality or all of the engine control modules of a field device can be configured by connecting a programming device to precisely one configuration interface of an engine control module or of a bus node or to a control unit.

In the case of an advantageous refinement of the invention, provision is made for at least one engine control module to comprise a sensor interface for connection of at least one drive sensor assigned to the electrical drive to be connected and for the engine control module to comprise a processing device for processing incoming sensor signals from the drive sensor and for controlling (open loop) or regulating (closed loop) the electrical drive energy for the electrical drive. Particularly fast processing of sensor signals from a drive sensor is ensured by the sensor interface directly designed on the engine control module. In the case of the drive sensor, it can, for example be a rotary encoder, as is used in particular in brushless engines. In addition, provision can be made for sensor signals of further sensors, which are connected to function modules of the field device, to be provided via the transmission device, optionally with interconnection of the control unit to the respective engine control module. In any case, the engine control module comprises a processing device which is designed for controlling (open loop) or regulating (closed loop) the electrical drive energy for the electrical drive and which is equipped for processing incoming sensor signals of the drive sensor in order to be able to carry out the desired control (open loop) or regulation (closed loop).

Provision is preferably made for the processing device to be designed for recording and processing information regarding the drive energy provided to the electrical drive as well as for providing an output signal that contains at least one parameter dependent on the drive energy provided. An actual duty cycle for the electrical drive connected to the engine control module can, for example thereby be determined, furthermore determination of the actual load of the electrical drive is also hereby possible. Provided the incoming sensor signals of the drive sensor and optionally further sensors are provided with time stamps using a temporal signal fed in externally or using a clock integrated in the processing device, a time-based assessment with regard to the use of the connected electrical drive can also be carried out. This is of interest in particular with respect to preventative maintenance of the enclosed electrical drives.

In the case of an advantageous refinement of the invention, a bus node is assigned to the control unit, which bus node is designed for a bidirectional conversion of bus commands and of status information between a predefinable field bus protocol and the internal signal transmission protocol. The bus node serves for the integration of the field device into an automation system, in which communication is provided between a superordinate control device, in particular a programmable logic controller, designed for controlling a plurality of field devices, and the control unit by means of a field bus system and an associated field bus protocol. The bus node is preferably designed to be easily interchangeable such that a simple adaptation of the field device to different field bus protocols is enabled by connecting a suitable bus node to the control unit.

In the case of an alternative configuration of the invention, the control unit is designed as a programmable logic controller and the function modules are designed for communication with the control unit according to a predefinable signal transmission protocol. In the case of the internal signal transmission protocol, it can be a field bus protocol or a proprietary internal bus protocol. The control unit is designed for independent, local control of the connected function modules and communicates with the function modules, preferably bidirectionally by means of the signal transmission protocol.

BRIEF DESCRIPTION OF THE DRAWINGS

An advantageous embodiment of the invention is depicted in the drawing. In this connection, it shows.

DETAILED DESCRIPTION OF THE PREFERRED EMBODIMENTS

Figure 1:
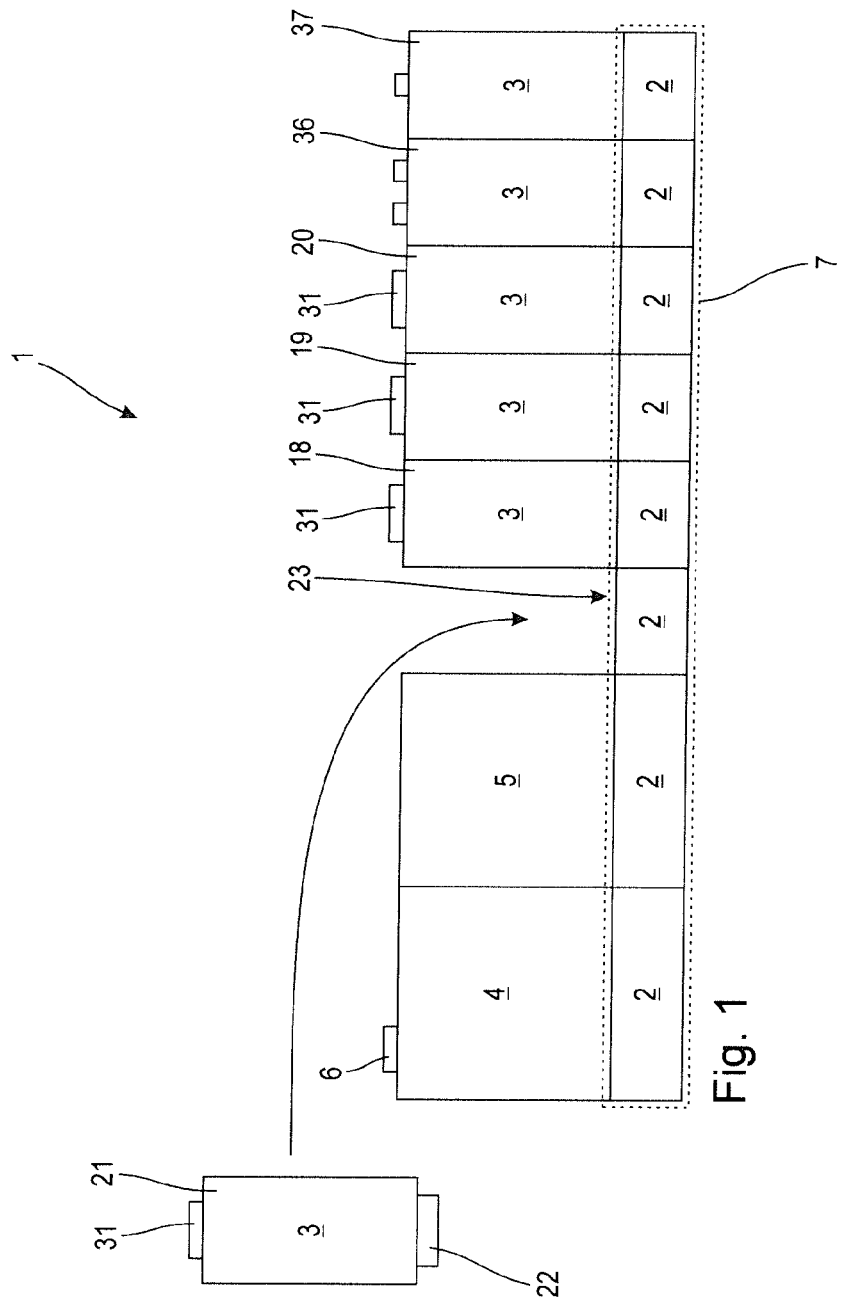
FIG. 1 a schematic front view of a field device for controlling actuators and for processing and relaying sensor signals, wherein a plurality of function modules are assigned to the field device, FIG. 2 a plan view of the field device according to FIG. 1 with an additional schematic depiction of components which are connected to the function modules and FIG. 3 a schematic side view of a transmission module, which is a component of the field device depicted in FIGS. 1 and 2.
Figure 2:
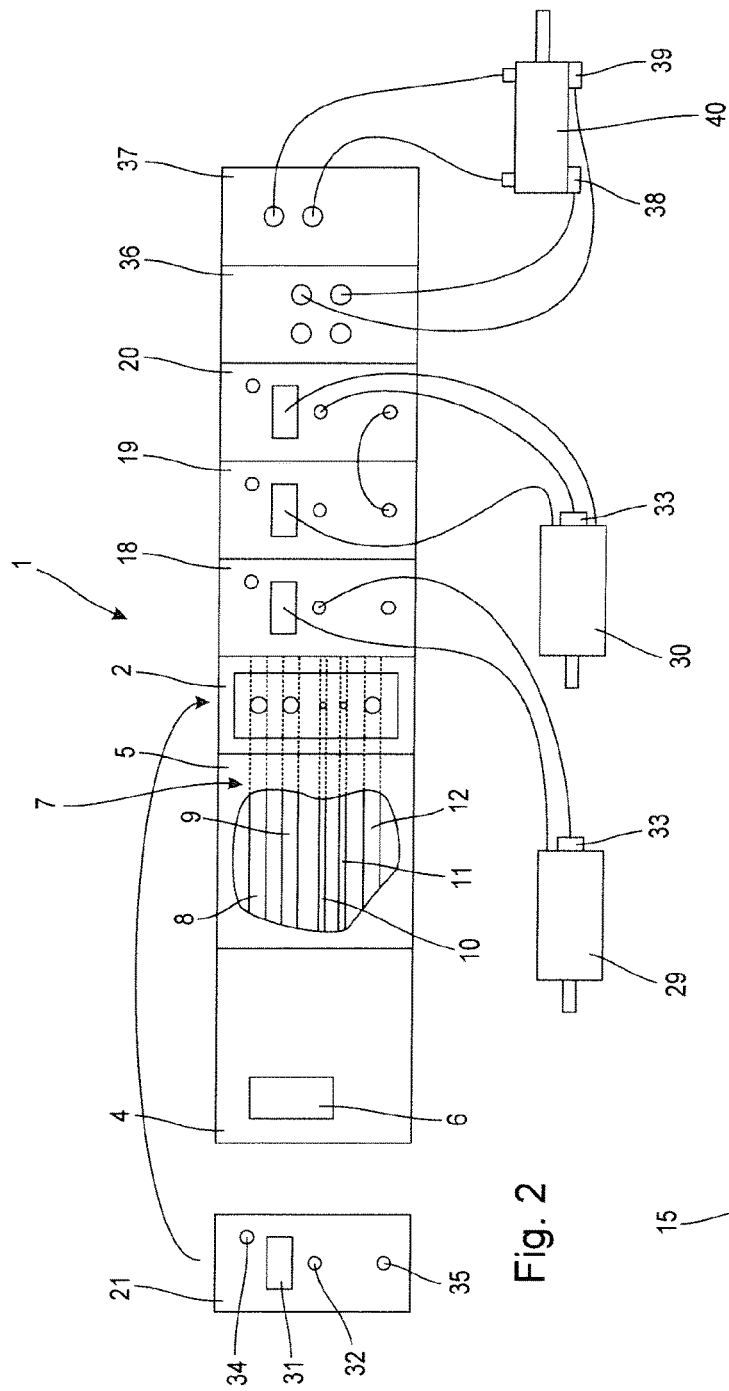

A field device 1 schematically depicted in FIGS. 1 and 2 is provided for use in an automation system not depicted in greater detail. In this respect, the automation system can, for example comprise a number of field devices of this type, which are connected to a superordinate control device similarly not depicted, in particular to a programmable logic controller via a common field bus system not depicted. Automation systems of this type are in particular used to operate processing machinery for machining workpieces or industrial robots.

The field device 1 depicted in FIGS. 1 and 2 comprises, for example a modular structure, wherein subdivision into transmission modules 2 and function modules 3 can be observed in FIG. 1. In this respect, the transmission modules 2 serve for providing electrical and optionally fluidic energy to the function modules 3. The function modules 3, which are explained in greater detail below, serve for controlling drives and for reading and processing sensor signals. Furthermore, the field device 1 comprises, for example a bus node 4 as well as a control unit 5. The bus node 4 and the control unit 5 are coupled in the same way as the function modules 3 to respectively assigned transmission modules 2.

The task of the bus node 4 substantially consists of bus commands, which are provided to a bus connection 6 of the field bus system not depicted and which are coded according to a predefinable field bus protocol (for example profibus), being converted into bus signals according to an internal signal transmission protocol of the field device 1. In this respect, signal transmission within the field device can be provided in the form of a bus system or as individual wiring or as a hybrid thereof. Conversion of bus signals from the field device 1 into bus commands for relaying to the superordinate control device can also optionally be carried out.

In the case of an embodiment of the invention not depicted, communication with a superordinate control device is dispensed with such that the bus node can also be omitted. In this case, the control signals are provided independently of the control unit. In another embodiment of the invention, similarly not depicted, direct control of the function modules is provided by a superordinate control device, in this case the control unit is dispensed with and an interconnected bus node ensures the communication between the field bus system and the function modules.

The task of the control unit 5 consists of converting the bus signals incoming from the bus node 4, which are based on the converted bus commands, into control signals for the connected function modules and providing these control signals to a transmission device 7, which is formed from the transmission modules 2 arranged in a row. Furthermore, the task of the control unit 5 also consists of processing sensor signals incoming from the function modules 3 and other status information of the function modules 3, which are provided with the aid of the transmission device 7 by the function modules 3 to the control unit 5 and optionally linking them with incoming bus signals. For example, the control unit 4 is equipped for generating new control signals for the function modules 3 and/or status notifications for the superordinate control device not depicted and connected via the bus node 4 from the incoming bus signals and sensor signals.

Figure 3:
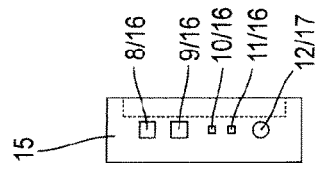

The transmission modules 2 comprise, according to the depiction of FIG. 2, respectively a plurality of electrical conductors 8 to 11 isolated with respect to each other and in particular aligned parallel to each other as well as for example a fluid conductor 12, which cross through the respective transmission modules 2. As emerges from FIG. 3, the electrical conductors and the fluid conductor 12 end at a lateral front side 15 at contact elements 16 designed in a planar manner or at an opening 17 of the fluid conductor 12 of the transmission modules 2. The transmission modules 2 can be connected to mechanical connection means, not depicted in greater detail with respectively adjacently arranged transmission modules 2 such that an electrical connection between the electrical conductors 8 to 11 is ensured via the assigned contact elements 16 and for the fluid conductor 12 by the openings 17 which are in communicating connection. For example, the electrical conductors 8 to 11 and the fluid conductor 12 are depicted in FIG. 2 in the region of the control unit 5 in a partial section arrangement and are continued in a dotted manner to the transmission module arranged adjacently to the right. However, in practice, the electrical lines 8 to 11 and the fluid conductor 12 cross through all transmission modules 2 in an advantageous embodiment of the invention, as they are depicted in FIGS. 1 to 3.

For example provision is made for the electrical conductors 8 and 9 to be fitted with a cross-section which enables provision of electrical drive energy for electrical drives, assigned to respective function modules 3, via the transmission device 7. In the case of electrical drives 29, 30, as they are depicted for example in FIG. 2, they are in particular brushless AC engines, which are controlled by the function modules designed as engine control modules 18, 19, 20. For this purpose, the electrical drives 29, 30 are supplied in a direct manner with electrical drive energy directly by the assigned engine control modules 18, 19, 20. A further engine control module 21 is provided according to the depictions of FIGS. 1 and 2 for assembly on a transmission module 2 which is arranged between the transmission module 2 for the control unit 18 and the transmission module 2 for the engine control module 18. For a plug-in assembly of this type, the engine control module 21 comprises a plug-in device 22 which is adapted to an interface 23 designed on the transmission module 2. For example, the interface 23 comprises a plurality of contact regions 24 to 27 as well as a fluid connection 28 which is, however, not used by the engine control module 21. By inserting the engine control module 21, an electrical connection between the plug-in device 22 of the engine control module 21 and the electrical conductors 8 to 11 of the transmission module 2 is established such that an electrical supply of the engine control module 21 with electrical supply energy is ensured via the electrical conductors 8 and 9. Furthermore, a signal-transmitting coupling between the engine control module 21 and the control unit 5 is ensured via the electrical conductors 10 and 11 which similarly cross through the transmission device 7.

Provision is for example made for the engine control module 18 to be connected to a first electrical drive 29 designed as a brushless DC engine, while the engine control modules 19 and 20 are connected to a second electrical drive 30 similarly designed as a brushless DC engine. For an electrical connection between the respective engine control module 18 to 20 and the assigned drive 29, 30, an engine connection 31 preferably designed as a plug connection is provided on the engine control module 18 to 20, into which engine connection is plugged the connection cable of the respectively assigned electrical drive 29, 30. Furthermore, sensor connections 32 for connecting at least one sensor, in particular a drive sensor assigned to the electrical drive 29, 30 are respectively designed on the engine control modules 18 to 21. In the case of an embodiment not depicted, a common connection for the drive and the at least one assigned sensor can be provided on the engine control module, in particular using a hydride cable designed for transmitting electrical power and electrical signals.

Provision is, for example made for a rotation sensor 33 to be arranged at each of the electrical drives 29, 30, which is connected to the respective engine control module 18 or 20 via a connection cable at the respective sensor connection 32.

Furthermore, the engine control modules 18 to 21 comprise a communication interface 34 which is designed for connecting a programming device not depicted in greater detail in order to enable parametrising of the respective engine control modules 18 to 21.

Moreover, a coupling interface 35 is designed at each of the engine control modules 18 to 21, which is designed for controlling or regulating coupling of engine control modules 18 to 21 and which enables synchronous operation of the engine control modules 19, 20 correspondingly coupled to each other. An electrical drive 30 can also hereby be operated with the field device 1, which has a power consumption which is greater than the power output of an individual engine control module 18 to 21. The coupling interface 35 is connected to a processing device arranged in the respective engine control module 18 to 21 and not depicted in greater detail. The processing device designed as an electronic circuit is equipped, inter alia, to ensure a coordinated, in particular synchronous mode of operation for correspondingly coupled engine control modules 18 to 21 through suitable information exchange of the engine control modules 18 to 21 with each other.

The field device 1 comprises, for example an input/output module 36 as well as a valve module 37 as further function modules 3. Both the input/output module 36 and the valve module 37 are in communicating connection with the control unit 5 via the transmission device 7. In this respect, the input/output module 36 is, for example provided to process positioning signals from end position sensors 38, 39, which are assigned to a fluid cylinder 40, and to relay them to the control unit 5.

The valve module 37 is provided for pneumatic control of the fluid cylinder 40, which valve module is connected to the fluid connections of the fluid cylinder 40 via suitable fluid lines, wherein an electrical and fluidic supply of the valve module 37 is ensured by the fluid conductor 12 integrated into the transmission device 7.

It is essential for the modular structure of the field device 1 for the transmission device 7, in addition to transmission of control signals which are intended for the respective function modules 3 via the electrical lines 10 and 11, to also be designed for transmission of electrical drive energy via the electrical conductors 8 and 9. The electrical drive energy can, for example occur via the field bus cable connectable to the bus node 4 or via a coupling station (not depicted) provided exclusively for this purpose and coupled with an assigned transmission module 2 to the transmission device 7 or at least via one of the engine control modules 18 to 21. It is hereby of particular significance that the transmission device 7 is designed such that an amount of electrical energy can be transmitted via the transmission modules 2, which amount of electrical energy is above the supply energy required by the valve modules and input/output modules. Due to the uniform design of the transmission device 7, free placement of the individual function modules 3 can be ensured along the field device 1.

It is particularly advantageous for at least one of the engine control modules 18 to 21 to be designed for feeding back electrical drive energy from the respectively assigned electrical drive 29 or 30 in order to provide this drive energy to the respectively other electrical drive 29, 30 and thus to ensure a particularly efficient mode of operation for the field device 1. The coupling interface 35 can be used for the coordination of such feedback of electrical drive energy between the individual engine control modules 18 to 21.

The individual function modules 3 as well as the transmission modules 2 and the bus node 4 as well as the control unit 5 are particularly preferably designed in a sealed manner such that they meet the requirements of the protection class IP 65. The field device 1 can hereby also be arranged directly on a processing machine or an industrial robot, without a switch cabinet being required therefor. A particularly compact and efficient structure of a corresponding processing machine or a corresponding industrial robot is hereby enabled.

The electrical conductors 8 and 9 arranged in the transmission device 7 are, for example provided for a low voltage supply of the engine control modules 18 to 21 with electrical drive energy, wherein typical supply voltage levels are at 12 volts, 24 volts and 48 volts. Currents in the range of a number of amperes can be transmitted via the electrical conductors 8 and 9 such that the electrical drives 29, 30 can push into power ranges greater than 100 watts, which is a significant difference to known field devices, in which only low amounts of electrical energy can be transmitted within the field device, which are only sufficient for covering a power requirement of valve modules and/or input/output modules.

In the case of an embodiment of a field device not depicted, a locally remote arrangement of at least one engine control module is provided. This can, for example be achieved by a so-called hydride cable, which is extended between the interface arranged at the respective transmission module and the plug-in device at the respective engine control module and which is designed both for transmission of the electrical drive energy and for transmission of the control signals. A particularly advantageous spatial distribution of the engine control modules can hereby be achieved on a processing machine or an industrial robot.

The invention claimed is:

1. A field device for controlling actuators and for processing and relaying sensor signals, the field device comprising:
a control unit for providing control signals;
a transmission device for transmitting the control signals within the field device, wherein the transmission device comprises at least one interface, which is designed for electrical coupling of a function module; and
at least one function module designed as an engine control module, which is equipped for controlling at least one electrical drive depending on control signals from the control unit,
wherein the control unit and the at least one function module are electrically connected to each other by means of the transmission device, and
wherein the transmission device is designed for providing electrical drive energy to the engine control module, and
wherein the engine control module is designed for providing electrical drive energy to the at least one drive in order to enable operation of the electrical drive with the electrical drive energy, and
wherein the transmission device is formed from a plurality of transmission modules electrically coupled to each other, and
wherein each of the transmission modules comprises an interface for electrical or for electrical and mechanical coupling of a function module as well as electrical lines with contact elements for electrical coupling with adjacent transmission modules, and
wherein the electrical lines are designed for providing the drive energy and the control signals to the interface and to adjacent transmission modules, and
wherein the transmission device is designed for providing at least one fluid flow to at least one interface and wherein at least one transmission module is provided with a fluid channel which leads to the assigned interface and wherein at least one function module is a valve module, and
wherein the transmission modules are arranged along an alignment axis and the interfaces are arranged on an assembly plane aligned parallel to the alignment axis.

2. The field device according to claim 1, wherein the transmission device is designed for providing electrical drive energy to a plurality of engine control modules.

3. The field device according to claim 1, wherein at least one function module is designed for coupling electrical energy to the transmission device.

4. The field device according to claim 1, wherein the transmission modules, the assigned interfaces and the function modules arranged on the interfaces are equipped with sealing means corresponding to each other, which ensure protection from dust, complete protection against contact and protection against strong jet water for the electrical lines and contact elements of the transmission modules and for the components accommodated in the function modules.

5. The field device according to claim 1, wherein a bus node is assigned to the control unit, which bus node is designed for bidirectional conversion of bus commands and of status information between a predefinable field bus protocol and the internal signal transmission protocol.

6. The field device according to claim 1, wherein the control unit is designed as a programmable logic controller, and wherein the function modules are designed for communication with the control unit according to an internal signal transmission protocol.

7. A field device for controlling actuators and for processing and relaying sensor signals, the field device comprising:
a control unit for providing control signals;
a transmission device for transmitting the control signals within the field device, wherein the transmission device comprises at least one interface, which is designed for electrical coupling of a function module; and
at least one function module designed as an engine control module, which is equipped for controlling at least one electrical drive depending on control signals from the control unit,
wherein the control unit and the at least one function module are electrically connected to each other by means of the transmission device, and
wherein the transmission device is designed for providing electrical drive energy to the engine control module, and
wherein the engine control module is designed for providing electrical drive energy to the at least one drive in order to enable operation of the electrical drive with the electrical drive energy, and
wherein the transmission device is formed from a plurality of transmission modules electrically coupled to each other, and
wherein each of the transmission modules comprises an interface for electrical or for electrical and mechanical coupling of a function module as well as electrical lines with contact elements for electrical coupling with adjacent transmission modules, and
wherein the electrical lines are designed for providing the drive energy and the control signals to the interface and to adjacent transmission modules, and
wherein the transmission device is designed for providing at least one fluid flow to at least one interface and wherein at least one transmission module is provided with a fluid channel which leads to the assigned interface and wherein at least one function module is a valve module, and
wherein at least one engine control module comprises a communication device for communication with further engine control modules and is equipped for forming a power network of engine control modules for the common supply of an electrical drive with drive energy.

8. The field device according to claim 7, wherein the transmission device is designed for providing electrical drive energy to a plurality of engine control modules.

9. The field device according to claim 7, wherein at least one function module is designed for coupling electrical energy to the transmission device.

10. The field device according to claim 7, wherein the transmission modules, the assigned interfaces and the function modules arranged on the interfaces are equipped with sealing means corresponding to each other, which ensure protection from dust, complete protection against contact and protection against strong jet water for the electrical lines and contact elements of the transmission modules and for the components accommodated in the function modules.

11. The field device according to claim 7, wherein a bus node is assigned to the control unit, which bus node is designed for bidirectional conversion of bus commands and of status information between a predefinable field bus protocol and the internal signal transmission protocol.

12. The field device according to claim 7, wherein the control unit is designed as a programmable logic controller, and wherein the function modules are designed for communication with the control unit according to an internal signal transmission protocol.

13. A field device for controlling actuators and for processing and relaying sensor signals, the field device comprising:
- a control unit for providing control signals;
- a transmission device for transmitting the control signals within the field device, wherein the transmission device comprises at least one interface, which is designed for electrical coupling of a function module; and
- at least one function module designed as an engine control module, which is equipped for controlling at least one electrical drive depending on control signals from the control unit,
- wherein the control unit and the at least one function module are electrically connected to each other by means of the transmission device, and
- wherein the transmission device is designed for providing electrical drive energy to the engine control module, and
- wherein the engine control module is designed for providing electrical drive energy to the at least one drive in order to enable operation of the electrical drive with the electrical drive energy, and
- wherein the transmission device is formed from a plurality of transmission modules electrically coupled to each other, and
- wherein each of the transmission modules comprises an interface for electrical or for electrical and mechanical coupling of a function module as well as electrical lines with contact elements for electrical coupling with adjacent transmission modules, and
- wherein the electrical lines are designed for providing the drive energy and the control signals to the interface and to adjacent transmission modules, and
- wherein the transmission device is designed for providing at least one fluid flow to at least one interface and wherein at least one transmission module is provided with a fluid channel which leads to the assigned interface and wherein at least one function module is a valve module, and
- wherein at least one engine control module comprises a communication device for communication with further engine control modules and is designed for the coordinated distribution of regenerated drive energy of the respectively assigned electrical drive to the further engine control modules.

14. The field device according to claim 13, wherein the transmission device is designed for providing electrical drive energy to a plurality of engine control modules.

15. The field device according to claim 13, wherein at least one function module is designed for coupling electrical energy to the transmission device.

16. The field device according to claim 13, wherein the transmission modules, the assigned interfaces and the function modules arranged on the interfaces are equipped with sealing means corresponding to each other, which ensure protection from dust, complete protection against contact and protection against strong jet water for the electrical lines and contact elements of the transmission modules and for the components accommodated in the function modules.

17. The field device according to claim 13, wherein a bus node is assigned to the control unit, which bus node is designed for bidirectional conversion of bus commands and of status information between a predefinable field bus protocol and the internal signal transmission protocol.

18. A field device for controlling actuators and for processing and relaying sensor signals, the field device comprising:
- a control unit for providing control signals;
- a transmission device for transmitting the control signals within the field device, wherein the transmission device comprises at least one interface, which is designed for electrical coupling of a function module; and
- at least one function module designed as an engine control module, which is equipped for controlling at least one electrical drive depending on control signals from the control unit,
- wherein the control unit and the at least one function module are electrically connected to each other by means of the transmission device, and
- wherein the transmission device is designed for providing electrical drive energy to the engine control module, and
- wherein the engine control module is designed for providing electrical drive energy to the at least one drive in order to enable operation of the electrical drive with the electrical drive energy, and
- wherein the transmission device is formed from a plurality of transmission modules electrically coupled to each other, and
- wherein each of the transmission modules comprises an interface for electrical or for electrical and mechanical coupling of a function module as well as electrical lines with contact elements for electrical coupling with adjacent transmission modules, and
- wherein the electrical lines are designed for providing the drive energy and the control signals to the interface and to adjacent transmission modules, and
- wherein the transmission device is designed for providing at least one fluid flow to at least one interface and wherein at least one transmission module is provided with a fluid channel which leads to the assigned interface and wherein at least one function module is a valve module, and
- wherein at least one engine control module comprises a configuration interface, which is designed for connection of a programming device usable for configuring the engine control module.

19. A field device for controlling actuators and for processing and relaying sensor signals, the field device comprising:
- a control unit for providing control signals;
- a transmission device for transmitting the control signals within the field device, wherein the transmission device comprises at least one interface, which is designed for electrical coupling of a function module; and
- at least one function module designed as an engine control module, which is equipped for controlling at least one electrical drive depending on control signals from the control unit,
- wherein the control unit and the at least one function module are electrically connected to each other by means of the transmission device, and
- wherein the transmission device is designed for providing electrical drive energy to the engine control module, and
- wherein the engine control module is designed for providing electrical drive energy to the at least one drive in order to enable operation of the electrical drive with the electrical drive energy, and wherein the transmission device is formed from a plurality of transmission modules electrically coupled to each other, and wherein each of the transmission modules comprises an interface for electrical or for electrical and mechanical coupling of a function module as well as electrical lines with contact elements for electrical coupling with adjacent transmission modules, and wherein the electrical lines are designed for providing the drive energy and the control signals to the interface and to adjacent transmission modules, and wherein the transmission device is designed for providing at least one fluid flow to at least one interface and wherein at least one transmission module is provided with a fluid channel which leads to the assigned interface and wherein at least one function module is a valve module, and wherein at least one engine control module comprises a sensor interface for connection of at least one drive sensor assigned to the connected electrical drive, and wherein the engine control module comprises a processing device for processing incoming sensor signals from the drive sensor and for controlling (open loop) or regulating (closed loop) the electrical drive energy for the electrical drive.

20. The field device according to claim 19, wherein the processing device is designed for recording and processing information regarding the drive energy provided to the electrical drive and for providing an output signal which contains at least one parameter dependent on the drive energy provided.

* * * * *